J. H. COOK.
LATHE CHUCK.
APPLICATION FILED AUG. 28, 1912.

1,048,944.   Patented Dec. 31, 1912.
2 SHEETS—SHEET 1.

WITNESSES
J. P. Appleman
X. H. Butler

INVENTOR
James H. Cook

J. H. COOK.
LATHE CHUCK.
APPLICATION FILED AUG. 28, 1912.
1,048,944.
Patented Dec. 31, 1912.
2 SHEETS—SHEET 2.
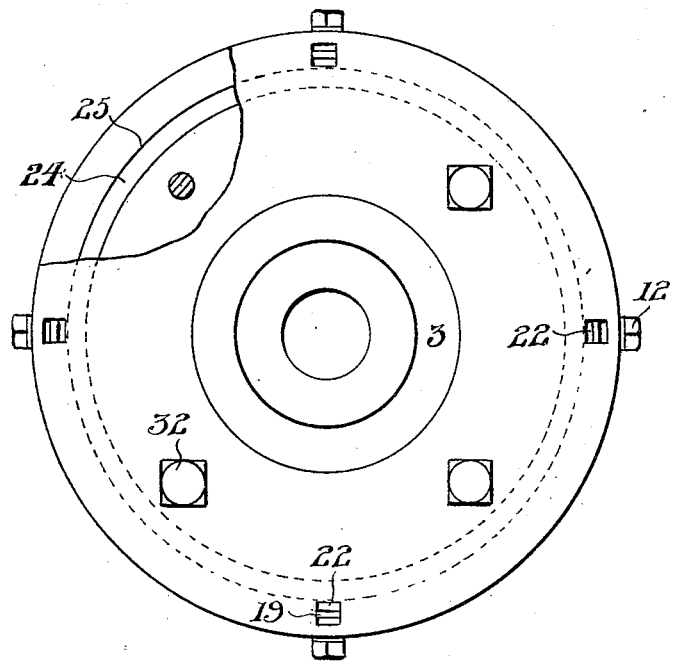
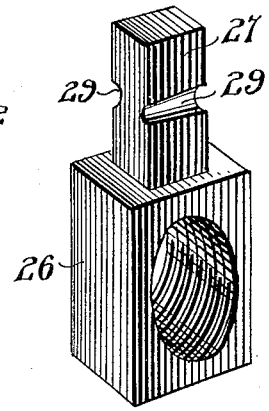
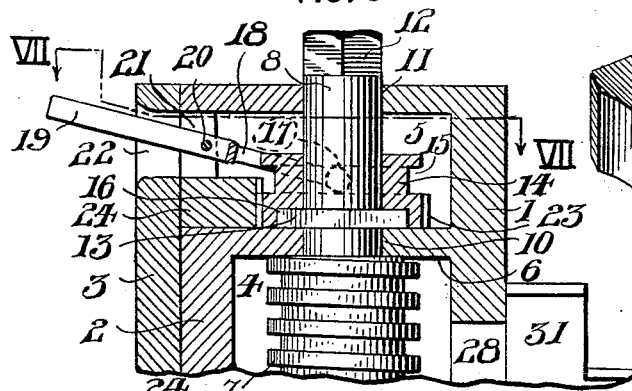
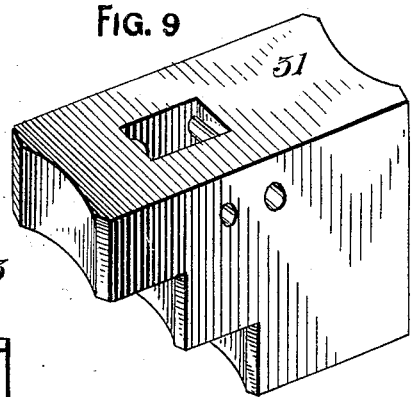
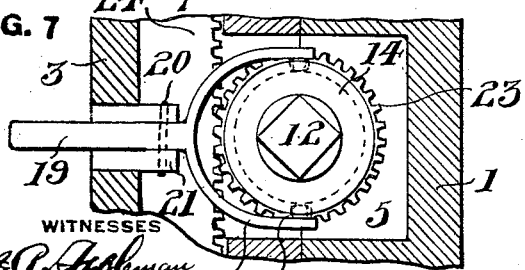
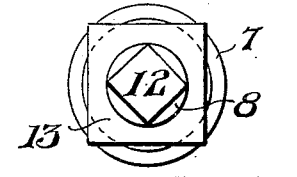
INVENTOR
James H. Cook

UNITED STATES PATENT OFFICE.

JAMES H. COOK, OF CONNELLSVILLE, PENNSYLVANIA.

LATHE-CHUCK.

1,048,944.　　　　　Specification of Letters Patent.　　Patented Dec. 31, 1912.

Application filed August 28, 1912. Serial No. 717,634.

*To all whom it may concern:*

Be it known that I, JAMES H. COOK, a citizen of the United States of America, residing at Connellsville, in the county of Fayette and State of Pennsylvania, have invented certain new and useful Improvements in Lathe-Chucks, of which the following is a specification, reference being had therein to the accompanying drawing.

This invention relates to a lathe chuck, and the primary object of my invention is the provision of positive and reliable means, in a manner as hereinafter set forth, for simultaneously adjusting the jaws of a chuck, or for independently adjusting the jaws as occasion may demand.

A further object of this invention is to provide a lathe chuck and adjusting mechanism that consists of comparatively few parts, inexpensive to manufacture, durable, easy to install and highly efficient for the purposes for which they are intended.

These and such other objects as may hereinafter appear are attained by a mechanical construction that will be presently described in detail and then claimed.

Reference will now be had to the drawings, wherein like numerals denote corresponding parts throughout the several views, in which:—

Figure 1:
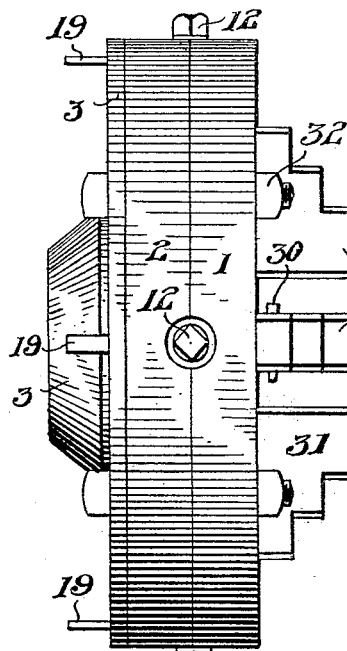
Figure 2:
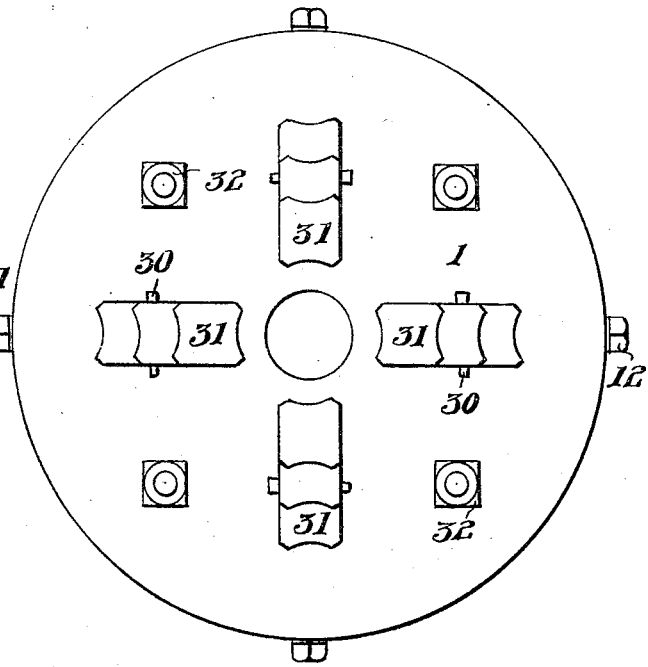
Figure 3:
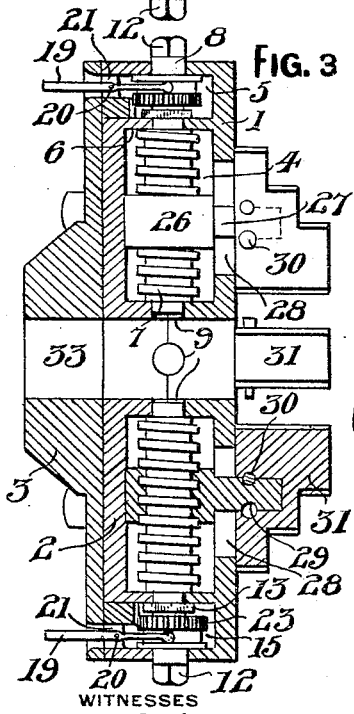
Figure 4:
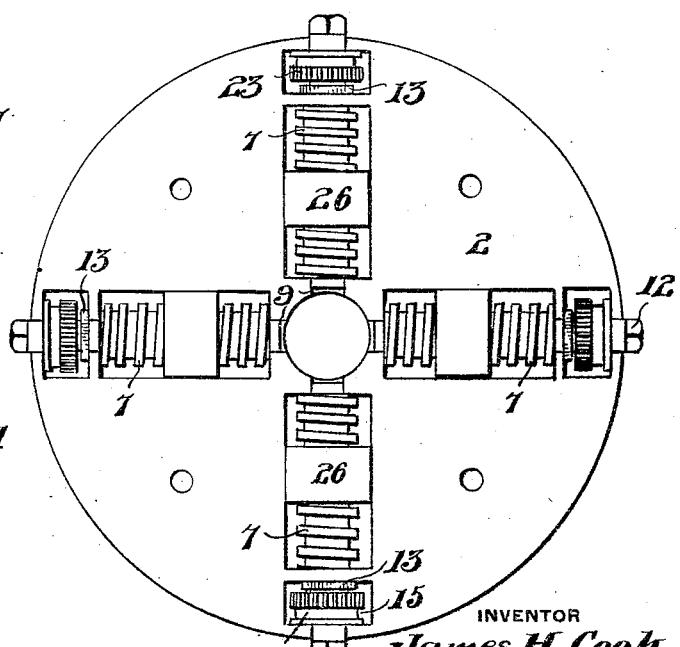

Figure 1 is a side elevation of a lathe chuck in accordance with this invention. Fig. 2 is a front elevation of the same. Fig. 3 is a vertical longitudinal sectional view of the lathe chuck. Fig. 4 is a rear elevation of the lathe chuck with the rear plate thereof removed. Fig. 5 is a rear elevation of the lathe chuck with the head thereof partly broken away. Fig. 6 is an enlarged vertical sectional view of a portion of the lathe chuck. Fig. 7 is a horizontal sectional view taken on the line VII—VII of Fig. 6. Fig. 8 is an enlarged perspective view of a detached nut. Fig. 9 is an enlarged perspective view of a portion of a jaw, and Fig. 10 is a plan of a screw adapted to form part of the lathe chuck.

A lathe chuck in accordance with this invention comprises a circular front plate 1, a circular rear plate 2, and a chuck head 3.

The front and rear plates 1 and 2 have the confronting faces thereof provided with confronting radially disposed screw recesses 4 and nut recesses 5, the recesses 4 and 5 being separated by a partition 6. The screw recesses are oblong and the nut recesses 5 are located adjacent to the peripheries of the front and rear plates 1 and 2. Located within the recesses 4 are longitudinally disposed screws 7, said screws having the stems 8 thereof extending into openings 9 in the inner walls of the recesses 4, through openings 10 provided therefor in the partition 6, and through openings 11 formed in the outer walls of the nut recesses 5. The screws 7 are therefore radially disposed and in order that said screws can be rotated, the outer ends of the stems 8 are provided with rectangular shanks 12. The stems 8 of the screws 7 have rectangular collars 13 within the nut recesses 5 and adapted to engage over said collars are nuts 14. The nuts 14 are slidably mounted upon the stems 8 within the recesses 5 and each nut has an annular groove 15 and a rectangular recess 16 to receive the collars 13 of the stems 8. Extending into the groove 15 of each nut are the oppositely disposed ends or lugs 17 of a yoke 18, carried by a lever 19 pivotally mounted upon a pin 20 arranged in apertured lugs 21 forming part of the chuck head 3. The lever 19 extends out of the open end of the nut recess 5 and through an opening 22 formed in the chuck head 3. The lever 19 can be easily shifted to slide the nuts 14 upon the stems 8, either to move the nuts out of engagement with the collars 13 or place said nuts in engagement therewith.

The nuts 14 are provided with integral pinions 23 and these pinions mesh with a circular movable rack 24 that is located in an annular groove 25 formed in the rear plate 2. The annular groove 25 intersects the open ends of the nut recesses 5 whereby the rack 24 can easily move circumferentially of the rear plate 2.

The screws 7 extend through rectangular nuts 26 arranged within the screw recesses 4 and are adjustable therein by rotating the screws 7. The nuts 26 have rectangular stems 27 extending through slots 28 formed in the front plate 1. The stems have keyways 29 and mounted upon said stems and retained thereon by keys 30 are stepped jaws 31. The jaws 31 are of the ordinary and well known type and can be reversed upon the stems 27, whereby the stepped faces of the jaws can be used for gripping various sizes of pieces of work.

The front plate 1, rear plate 2 and chuck head 3 are connected together by screw bolts 32 or other fastening means and the plates 1 and 2 and the head 3 have central alining openings 33 whereby the chuck can be used in connection with a lathe.

With the shiftable nuts 14 in engagement with the collars 13 of the screws 7, a movement of one of said screws imparts a similar movement to the other of said screws through the medium of the rack 24, consequently all of the stepped jaws 31 can be adjusted in unison. When it is desired to adjust one of the jaws independent of the other jaw, the nut 14 of the particular jaw is moved out of engagement with the collar 13. The stem 8 of the screw 7 can then be adjusted, without moving the nut 14 or the rack 24, consequently the single jaw can be moved in a desired direction independent of the other jaws.

The separable plates 1 and 2 permit of the screws 7 and the other parts of the adjusting mechanism being easily and quickly assembled, and the chuck head 3 permits of the circular rack 24 being placed in position to mesh or engage the pinions 23 of the nuts 14.

It is thought that the operation and utility of the lathe chuck will be apparent without further description, and while in the drawing there is illustrated a preferred embodiment of the invention, it is to be understood that the structural elements are susceptible to such modifications, and variations that fall within the scope of the appended claims.

What I claim is:—

1. A lathe chuck comprising separable plates, radially disposed rotatable screws arranged between said plates, jaw supporting nuts movable between said plates by a movement of said screws, collars carried by said screws, shiftable nuts arranged upon said screws and adapted to be shifted into engagement with the collars thereof, and means arranged in one of said plates and engaging said shiftable nuts whereby said screws can be adjusted in unison by a movement of one of said screws.

2. A lathe chuck comprising separable plates, radially disposed rotatable screws arranged between said plates, jaw supporting nuts movable between said plates by a movement of said screws, collars carried by said screws, shiftable nuts arranged upon said screws and adapted to be shifted into engagement with the collars thereof, means arranged in one of said plates and engaging said shiftable nuts whereby said screws can be adjusted in unison by a movement of one of said screws, and means carried by one of said plates and engaging said shiftable nuts to facilitate moving said nuts into and out of engagement with the collars of said screws.

3. A lathe chuck comprising separable plates having the confronting faces thereof recessed, rotatable screws arranged in the recessed faces of said plates, nuts arranged between said plates and movable therebetween by an adjustment of said screws, jaws supported by said nuts at the outer side of one of said plates, shiftable nuts slidably mounted upon said screws and capable of rotating therewith, a circular rack arranged in one of said plates and engaging said shiftable nuts whereby said nuts can be rotated in unison, and means carried by one of said plates to facilitate shifting said nuts whereby one of said screws can be adjusted independently of the other of said screws.

4. A lathe chuck comprising plates, radially disposed screws rotatable between said plates, jaws arranged for adjustment by a movement of said screws, shiftable nuts associated with said screws between said plates and capable of moving in unison with said screws, means arranged in one of said plates whereby said nuts can be rotated in unison, and means carried by the same plate for shifting said nuts whereby one of said screws can be adjusted independent of the other screw.

In testimony whereof I affix my signature in the presence of two witnesses.

JAMES H. COOK.

Witnesses:
MAX H. SROLOVITZ,
J. P. APPLEMAN.

---

Copies of this patent may be obtained for five cents each, by addressing the "Commissioner of Patents, Washington, D. C."